Patented Mar. 13, 1934

1,950,388

UNITED STATES PATENT OFFICE 1,950,388

SOFTENING LEAD BULLION

Jesse Oatman Betterton and Robert Archibald Crites, Omaha, Nebr., and Henry Paul Wagner, Gravesend, England, assignors to American Smelting and Refining Company, New York, N. Y., a corporation of New Jersey No Drawing. Application February 18, 1932, Serial No. 593,863

4 Claims. (Cl. 75—15)

This invention relates to the purification of metals and more specifically to the softening of lead bullion with particular reference to the utilization of antimony in the softening process. The invention further concerns an efficient, rapid and economical process for the removal of impurities from lead by which antimony, often a troublesome impurity, is utilized in the refining process.

It is well known that lead bullion as it comes from the blast furnace often contains appreciable amounts of silver, gold and other precious and semi-precious metals. Furthermore, the bullion contains other impurities, among which may be arsenic, tin and antimony and it is imperative that these be removed by a softening process in order to obtain refined lead of a desired and proper quality. Again, in the case of argentiferous bullion the removal of these impurities materially aids subsequent desilverization operations and of the three impurities named, arsenic probably is the most troublesome in so far as desilverization is concerned.

In general, the softening process as disclosed by the prior art consists of first, liquation, whereby such impurities as sulphur, copper, and some arsenic are removed at relative low temperatures and secondly, oxidation, whereby at higher temperatures such impurities as antimony, arsenic and tin combine with lead oxide formed at the same time and are removed as drosses. It is to the treatment, regulation and control of the antimony content in aid of the sofening process that our invention chiefly relates.

We have discovered a novel method by which antimony may be utilized to facilitate the softening process. In other words, we have invented a method whereby antimony, often a troublesome impurity, may be made to aid in the elimination and removal of itself and other impurities from the lead bullion, or in the case of bullion free from antimony, it may be added to aid in the elimination of such impurities as are present.

Obviously, this may be accomplished in a variety of ways within the spirit and scope of the invention. For example, the antimony may be added as the pure metal or it may be added, as hereinafter described, as a dross or slag from the final oxidation stage in the softening process. Again, the antimony or antimony bearing material may be added to the impure lead before or after charging the bullion to a softening furnace.

To those skilled in the art many other changes and substitutions in using our invention will occur, but the following detailed descriptive explanation is given as a practical commercial example of how our invention may be practiced.

As previously mentioned, the usual softening process contemplates the oxidation of impurities and the removal of antimony and other impurities from the furnace at intervals during each charge. However, for an economical operation of our invention, we find it very desirable to have a regulated amount of antimony in the furnace at all times, either in the bath or slag depending, of course, on the particular stage of the softening process.

As an example, then, a quantity of impure bullion containing antimony as an impurity, is charged to the softening furnace, which furnace already contains a quantity of molten softened lead covered by the antimony slag remaining after the final oxidation or blowing out period of the preceding charge. Although no exact proportion of impure to softened bullion is essential for the successful operation of our process, we have found that 200 tons of impure bullion charged into a furnace containing 100 tons of softened lead works well in practise and simplifies operating calculations.

As above stated, we allow antimony to remain on the top of the bath when the softened charge is tapped out instead of skimming it off as is the usual practise. We do this because we have found that the antimony, due to its low melting point, quickly liquefies and materially accelerates the softening action.

Our aim then is to make this slag or dross containing antimony, molten as soon as possible or better still, to keep it liquid during the entire cycle. To do this the most impure bullion should be charged first in order to raise the antimony content of the slag and cause it, if not already liquid, to become so quickly. By this means the metal below the slag may be more easily heated as a liquid slag has much less of an insulating effect than does a spongy layer of dry oxides.

After charging the harder bullion the charging may proceed more slowly while the slag and bath are heating and the softening action is proceeding. We have made it our practise to introduce water pipes as soon as the metal level is sufficiently high and then keep the bath rolling while the furnace is being filled. The temperature is raised to approximately 1400° F. in the flue until the bath is brought to a dull red heat and the charge is then held at about that temperature. The bath is kept rolling during the heating period which generally is from two to five hours. It is, of course, understood that there may be a wide variation in temperatures of the bath in which successful softening may be accomplished.

When the softening action has proceeded sufficiently for slag treatment or removal, the usual tin and arsenic skimmings may be made if the bullion contains sufficient quantities of these elements but such skimmings should not be made if they will jeopardize the antimony control hereinafter to be disclosed.

The proper time for slag treatment, if any is practised, and skimming, we have found to be when the bath contains from .5% to .9% antimony. The reason for skimming while the antimony content of the bath is high is to provide for the formation of an easily fusible antimonial slag during the final oxidation or blowing out process which will remain liquid on the bath during the tapping and next charging period heretofore disclosed.

In order to insure a sufficient antimony content during the entire cycle, no attempt should be made to skim more than one charge out of three of bullion containing less than .6% antimony. By this means, if the bullion is too low in antimony, the antimony content may be built up in the furnace simply by not skimming until a sufficient amount of antimony is in the bath. In other words, regardless of the original antimony content of the bath, the bath should and can be made to contain .5% to .9% antimony when the skims are made and in the control of the antimony content, as disclosed, lies a large part of the successful application of the invention.

On charges that are above .3% antimony after skimming and in which the next charge is computed to require more lead oxide than is normally made during the final oxidation period, lead oxides may be added immediately. This is the proper time for oxide additions because the lead is clean and hot and will rapidly distribute the fused oxide; and a more intimate contact between the lead oxide and antimony in the bath is obtained than when the oxide is thrown on a layer of slag as the latter will tend to solidify due to the low temperature of the oxide. Again, the softening proceeds more rapidly as more bath surface is exposed to the molten litharge when charged on a clean bath containing antimony.

After skimming and any necessary or desired additions of PbO, the bath is blown with water pipes to oxidize out the antimony. It generally takes from 4 to 6 hours to reduce the antimony content of the bath from its .5% to .9% at the skimming stage to the desired final point and this may be accomplished under the lead oxide slag at a temperature of approximately 1200° F. to 1400° F. When the antimony content is sufficiently eliminated, say to .01%, the softened lead is tapped from the furnace, the molten slag containing antimony remains in the furnace and the next charge is made.

It is to be noted that our invention is not limited in its application to lead containing antimony as an impurity, for although the example of our invention given above contemplates deriving antimony from the lead being purified, it is obvious to the expert that such is not necessary. For example, if the impure lead contains no antimony, antimony can be added from a difference source and our invention practised in such manner.

What is claimed is:

1. In the refining of lead the process that comprises introducing a charge of impure lead containing antimony into a furnace containing a quantity of molten softened lead covered by an antimonial slag formed during the final oxidation stage of the preceding charge, heating said furnace to form a molten bath, agitating said bath, maintaining said bath at a temperature of approximately 1400° F. whereby impurities, including some antimony, are oxidized and collect on the surface of said bath, continuing said oxidation until the antimony content of the bath is between .5% and .9% antimony, removing said oxidized impurities from the surface of said bath, making additions of lead oxide in desired quantities to said bath, continuing oxidation whereby remaining impurities in said bath are reduced to a desired low point, removing a desired quantity of softened lead from said bath and allowing sufficient molten softened lead covered by the final oxidized impurities to remain in said furnace for the succeeding charge.

2. In the refining of lead the process that comprises introducing a charge of impure lead containing antimony into a furnace containing a quantity of softened lead on the surface of which remains an antimonial slag from the final oxidation stage of the preceding charge, heating said furnace to form a molten bath, subjecting said molten bath to oxidizing conditions whereby impurities and a minimum of lead are oxidized and collect on the surface of said bath and the antimony content of said bath proper is reduced to between .5% and .9% antimony, removing said oxidized impurities from the surface of said bath, continuing oxidation to remove practically all the remaining impurities from the bath and removing softened lead from said furnace.

3. In softening lead the process whereby impure lead is charged to a furnace containing a quantity of softened lead from the preceding charge covered by an antimonial slag formed in the final oxidation stage of said preceding charge, heating the lead whereby impurities are oxidized to form drosses, removing said drosses while the antimony content of the lead is still high, agitating the lead bath to oxidize the remaining impurities into a dross, allowing said final dross containing antimony to remain on the top of the softened lead and removing said softened lead from the furnace.

4. In refining lead the process that comprises introducing impure lead into a furnace containing softened lead covered by a final antimonial slag from the preceding charge, heating said furnace to a temperature of approximately 1200–1400 degrees F. whereby a molten bath is formed, agitating said bath, maintaining said temperature whereby impurities are oxidized, removing said oxidized impurities while the antimony content of said bath ranges from .5% to .9% antimony, continuing the oxidation to reduce said antimony content of said bath to a desired point, allowing the oxidized antimony to remain on the surface of said bath and removing softened lead from said furnace.

JESSE OATMAN BETTERTON.
ROBERT ARCHIBALD CRITES.
HENRY PAUL WAGNER.